(12) United States Patent
Schelm et al.

(10) Patent No.: US 11,175,890 B2
(45) Date of Patent: Nov. 16, 2021

(54) HEXADECIMAL EXPONENT ALIGNMENT FOR BINARY FLOATING POINT UNIT

(71) Applicant: International Business Machines Corporation, Armonk, NY (US)

(72) Inventors: Kerstin Claudia Schelm, Stuttgart (DE); Petra Leber, Ehningen (DE); Nicol Hofmann, Leinfelden-Echterdingen (DE); Michael Klein, Schoenaich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 16/398,438

(22) Filed: Apr. 30, 2019

(65) Prior Publication Data

US 2020/0348908 A1 Nov. 5, 2020

(51) Int. Cl.
*G06F 7/483* (2006.01)
*G06F 7/499* (2006.01)
*G06F 9/30* (2018.01)

(52) U.S. Cl.
CPC .......... *G06F 7/483* (2013.01); *G06F 7/49942* (2013.01); *G06F 9/3001* (2013.01); *G06F 9/30025* (2013.01)

(58) Field of Classification Search
CPC .... G06F 7/483; G06F 7/49942; G06F 9/3001; G06F 9/30025
See application file for complete search history.

(56) References Cited

U.S. PATENT DOCUMENTS

| 4,845,659 | A | * | 7/1989 | Hrusecky | ............... | G06F 7/483 |
| | | | | | | 712/222 |
| 5,117,384 | A | * | 5/1992 | Drehmel | ............... | G06F 7/485 |
| | | | | | | 708/505 |
| 5,191,335 | A | * | 3/1993 | Leitherer | ............... | H03M 7/24 |
| | | | | | | 341/50 |
| 2002/0095451 | A1 | * | 7/2002 | Krygowski | ............ | G06F 7/483 |
| | | | | | | 708/495 |
| 2006/0173946 | A1 | | 8/2006 | Trong et al. | | |
| 2006/0190708 | A1 | * | 8/2006 | Schwarz | ............... | G06F 9/3836 |
| | | | | | | 712/221 |
| 2015/0378677 | A1 | | 12/2015 | Dao et al. | | |
| 2018/0246721 | A1 | | 8/2018 | Schwarz et al. | | |

* cited by examiner

*Primary Examiner* — Michael D. Yaary
(74) *Attorney, Agent, or Firm* — Cantor Colburn LLP; Margaret McNamara (57) ABSTRACT

Examples of techniques for hexadecimal exponent alignment for a binary floating point unit (BFU) of a computer processor are described herein. An aspect includes receiving, by the BFU, a first operand comprising a first fraction and a first exponent, and a second operand comprising a second fraction and a second exponent. Another aspect includes, based on the first operand and the second operand being in a first floating point format, multiplying each of the first exponent and the second exponent by a factor corresponding to a number of bits in a digit in the first floating point format.

14 Claims, 4 Drawing Sheets

HEXADECIMAL EXPONENT ALIGNMENT FOR BINARY FLOATING POINT UNIT

BACKGROUND

The present techniques relate to computer processors. More specifically, the techniques relate to hexadecimal exponent alignment for a binary floating point unit (BFU) of a computer processor.

A binary floating point unit (BFU) is a part of a computer processor that is designed to carry out operations on floating point numbers. Operations may include but are not limited to addition, subtraction, multiplication, fused multiplication and addition, fused multiplication and subtraction, division, square root, and/or exponential or trigonometric calculations. A BFU may comprise a plurality of functional blocks. The speed of the BFU may significantly affect the speed of the computer system as a whole.

SUMMARY

According to an embodiment described herein, a system can include a BFU of a processor to receive a first operand comprising a first fraction and a first exponent, and a second operand comprising a second fraction and a second exponent. The BFU can also, based on the first operand and the second operand being in a first floating point format, multiply each of the first exponent and the second exponent by a factor corresponding to a number of bits in a digit in the first floating point format.

According to another embodiment described herein, a method can include receiving, by a BFU of a processor, a first operand comprising a first fraction and a first exponent, and a second operand comprising a second fraction and a second exponent. The method can also include, based on the first operand and the second operand being in a first floating point format, multiplying, by an exponent unit of the BFU, each of the first exponent and the second exponent by a factor corresponding to a number of bits in a digit in the first floating point format.

According to another embodiment described herein, an apparatus can include logic to receive a first operand comprising a first fraction and a first exponent, and a second operand comprising a second fraction and a second exponent. The logic can also, based on the first operand and the second operand being in a first floating point format, multiply each of the first exponent and the second exponent by a factor corresponding to a number of bits in a digit in the first floating point format.

DETAILED DESCRIPTION

Embodiments of hexadecimal exponent alignment for a binary floating point unit (BFU) of a computer processor are provided, with exemplary embodiments being discussed below in detail. A computer processor may support numbers that are represented in both hexadecimal floating point format and binary floating point format. Alignment of hexadecimal format exponents may allow operations involving both formats to be executed by the same logic in the BFU. The BFU may map these different formats to one common dataflow.

A floating point number may include a sign, an exponent, and a fraction. A binary floating point number may take the following format:

$$(-1)^{sign} * 2^{(exponent)} * 1.\text{fraction};$$

while hexadecimal floating point number may take the following format:

$$(-1)^{sign} * 16^{(exponent)} * 0.\text{fraction}.$$

The individual fields (i.e., sign, exponent, and fraction) in a floating point number in the BFU may be represented in binary, i.e., as strings of bits holding ones or zeroes. Calculations on the exponent may control elements of the data flow in a BFU. For example, the BFU may calculate a shift amount for the aligner based on the exponent difference between the operand, and a shift amount from the normalizer based on a number of leading zeroes in the result. Rounding may also modify the result exponent.

A BFU may right align the exponents for both hexadecimal and binary floating point formats. However, the right alignment may lead to different calculations for control values, such as aligner or normalizer shift amounts, for binary format versus hexadecimal format, requiring additional hardware in the BFU. Because the aligner shift amount is based on the exponent difference between the operands, an exponent difference of one may correspond to a single bit shift for binary floating point format, and a 4 bit shift for hexadecimal floating point format, as each digit in a hexadecimal number corresponds to 4 bits in the fraction. Multiplying the exponent of a hexadecimal format operand by a factor of 4 (e.g., 100 in binary) causes the aligner shift amount to automatically account for the 4-bit shift for hexadecimal format digits. Therefore, no selection is required at the aligner between the aligner shift amounts for binary format versus hexadecimal format.

Shifting of the hexadecimal exponent alignment by an amount corresponding to a number of bits in a hexadecimal digit for hexadecimal floating point numbers in a combined binary and hexadecimal BFU causes the exponent to correspond to the fraction bit weight that is represented by the exponent for both binary and hexadecimal floating point numbers. This allows simplification of the calculation of the aligner shift amount and the normalizer shift amount in the BFU. The BFU logic for the calculation of the aligner shift amount and the normalizer shift amount may be shared between the binary and hexadecimal formats. The BFU logic for the calculation of the exponent after the normalization shift amount has been determined may also be simplified and shared between the binary and hexadecimal formats.

In some embodiments, exponent correction due to rounding for a hexadecimal exponent may also be accomplished by forcing each of the two least significant bits in the exponent to one. Rounding is performed in the BFU to put the result of an operation into a desired output format (including but not limited to single precision or double precision). The exponent may be increased by one if the rounding leads to an additional digit in the fraction (e.g., rounding up). The multiplication by the factor of 4 causes a hexadecimal exponent to include two zeroes (00) in the two least significant bits. The increasing of the exponent due to rounding may be achieved by setting each of these two least significant bits in a hexadecimal exponent to one (i.e., 11), and adding one to the least significant bit of the exponent. The setting of the two least significant bits to one may be done in an uncritical path of the BFU, with only one additional OR gate per bit, and may not impact timing in the BFU.

Figure 1:
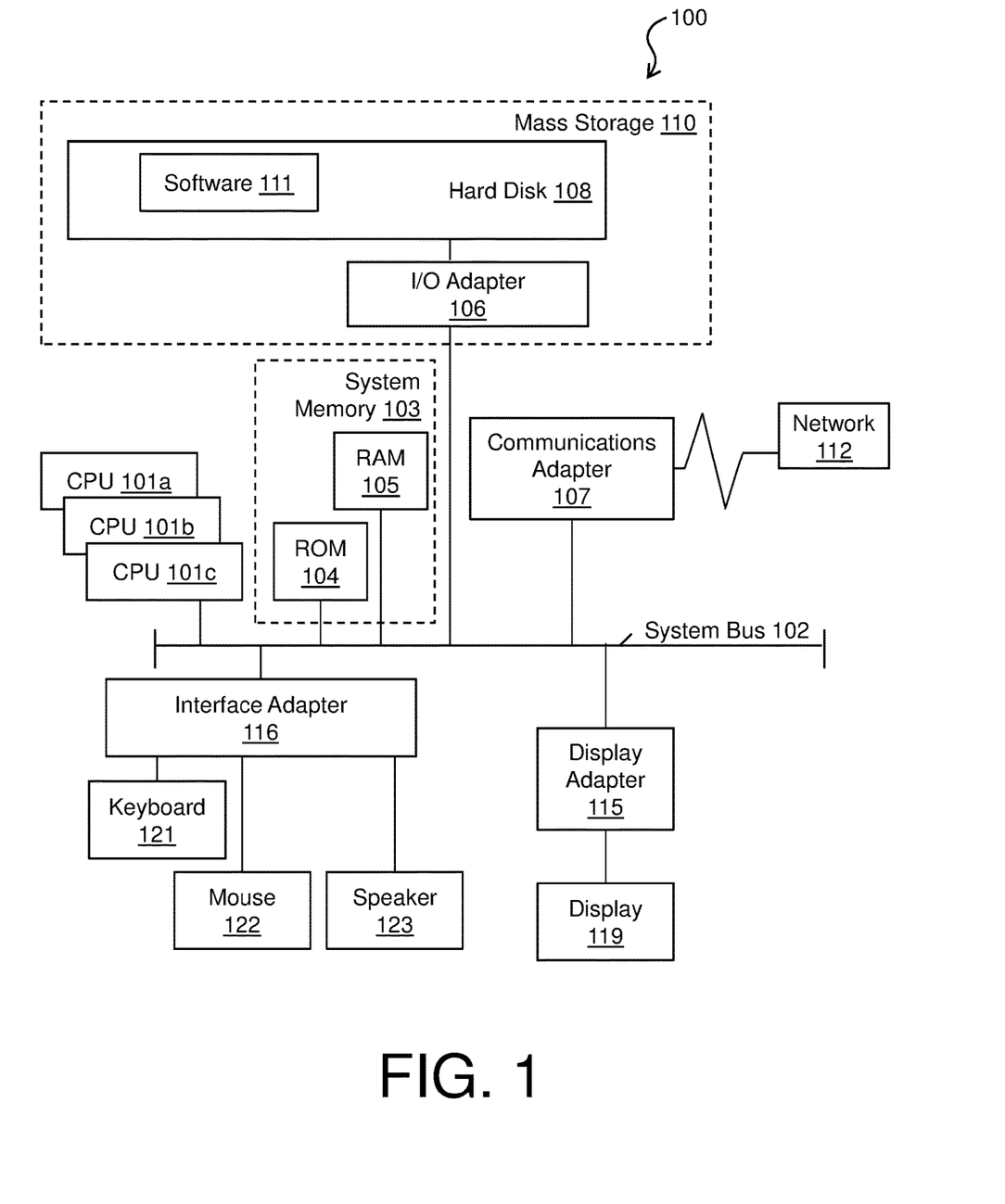
FIG. 1 is a block diagram of an example computer system for use in conjunction with hexadecimal exponent alignment for a binary floating point unit in a computer processor.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
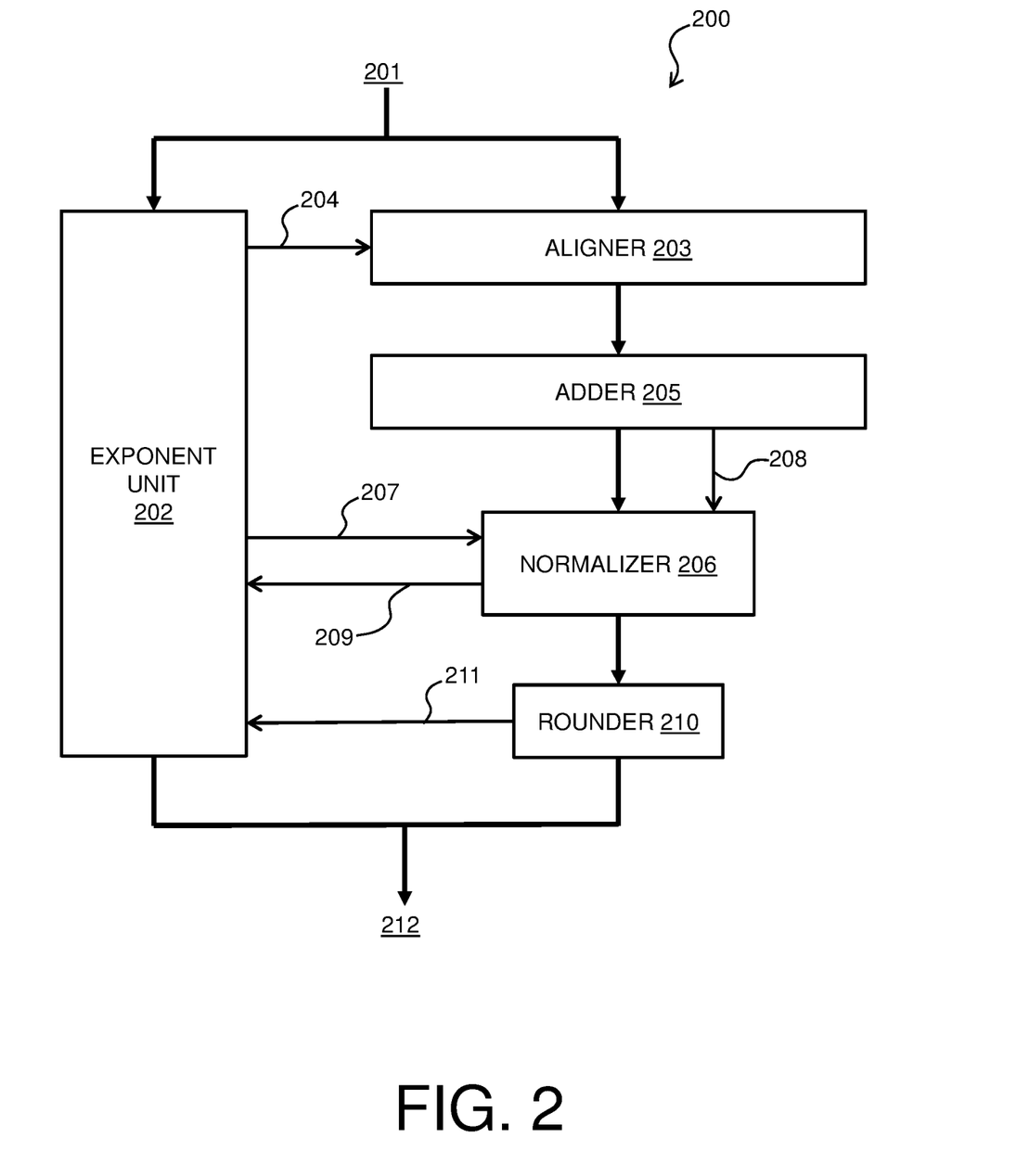
FIG. 2 is a block diagram of an example binary floating point unit including hexadecimal exponent alignment.

FIG. 2 is a block diagram of an example BFU 200 including hexadecimal exponent alignment. Binary floating point unit 200 may be included in any appropriate processor, such as processors 101 of computer system 100 of FIG. 1. BFU 200 includes an input 201 that receives operands comprising numbers in either hexadecimal floating point or binary floating point format. The BFU 200 may receive any appropriate number of operands corresponding to a given floating point operation, and may also receive an operation code that specifies the type of operation and a format of the operands (e.g., binary or hexadecimal). Each operand includes a sign, an exponent, and a fraction. The exponents of the operands are provided to exponent unit 202, and the fractions of the operands are provided to aligner 203. The exponent unit 202 aligns the exponents of the operands as described below with respect to FIGS. 3 and 4 based on the format of the operands, which is given by the operation code. Exponent unit 202 then calculates an aligner shift amount 204 based on an exponent difference between the operands. The determination of the aligner shift amount 204 may be performed by the same logic in the exponent unit 202 for both binary and hexadecimal format numbers. The aligner shift amount 204 is provided from exponent unit 202 to aligner 203. The aligner 203 shifts the fraction of at least one of the operands based on the aligner shift amount 204. The adder 205 then performs an operation on the aligned fractions of the operands after the aligner shift amount 204 has been applied. The adder 205 outputs a fraction corresponding to the result to normalizer 206.

Exponent unit 202 determines a first normalizer shift amount 207 that is provided to the normalizer 206, and a leading zero anticipator module in adder 205 determines a second normalizer shift amount 208 that is also provided to the normalizer 206. Normalizer 206 selects one of the first normalizer shift amount 207 and second normalizer shift amount 208 based on control information corresponding to the result, and the selected normalizer shift amount 209 is sent back to the exponent unit 202. The normalizer 206 shifts out any leading zeroes in the fraction of the result based on the selected normalizer shift amount 209. The determination of the selected normalizer shift amount 209 may be performed by the same logic in the normalizer 206 for both binary and hexadecimal format numbers. The exponent unit 202 adjusts the exponent of the result based on the selected normalizer shift amount 209. The adjusting of the exponent of the result based on the selected normalizer shift amount 209 may be performed by the same logic in the exponent unit 202 for both binary and hexadecimal format numbers. The rounder 210 puts the fraction of the result into an output floating point format (including but not limited to single precision or double precision), and notifies the exponent unit 202 via rounding notification 211 as to whether the result was rounded up, and the rounding caused an additional most significant fraction bit or digit in the fraction that makes exponent adjustment necessary. The exponent unit 202 adjusts the exponent of the result based on the rounding notification 211. The formatted result is then output on BFU output 212, including the exponent from exponent unit 202 and the fraction from rounder 210. Operation of embodiments of BFU 200 of FIG. 2 is discussed in further detail below with respect to system 300 of FIG. 3 and method 400 of FIG. 4.

It is to be understood that the block diagram of FIG. 2 is not intended to indicate that the BFU 200 is to include all of the components shown in FIG. 2. Rather, the BFU 200 can include any appropriate fewer or additional components not illustrated in FIG. 2 (e.g., additional memory components, embedded controllers, functional blocks, connections between functional blocks, modules, inputs, outputs, etc.). Further, the embodiments described herein with respect to BFU 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
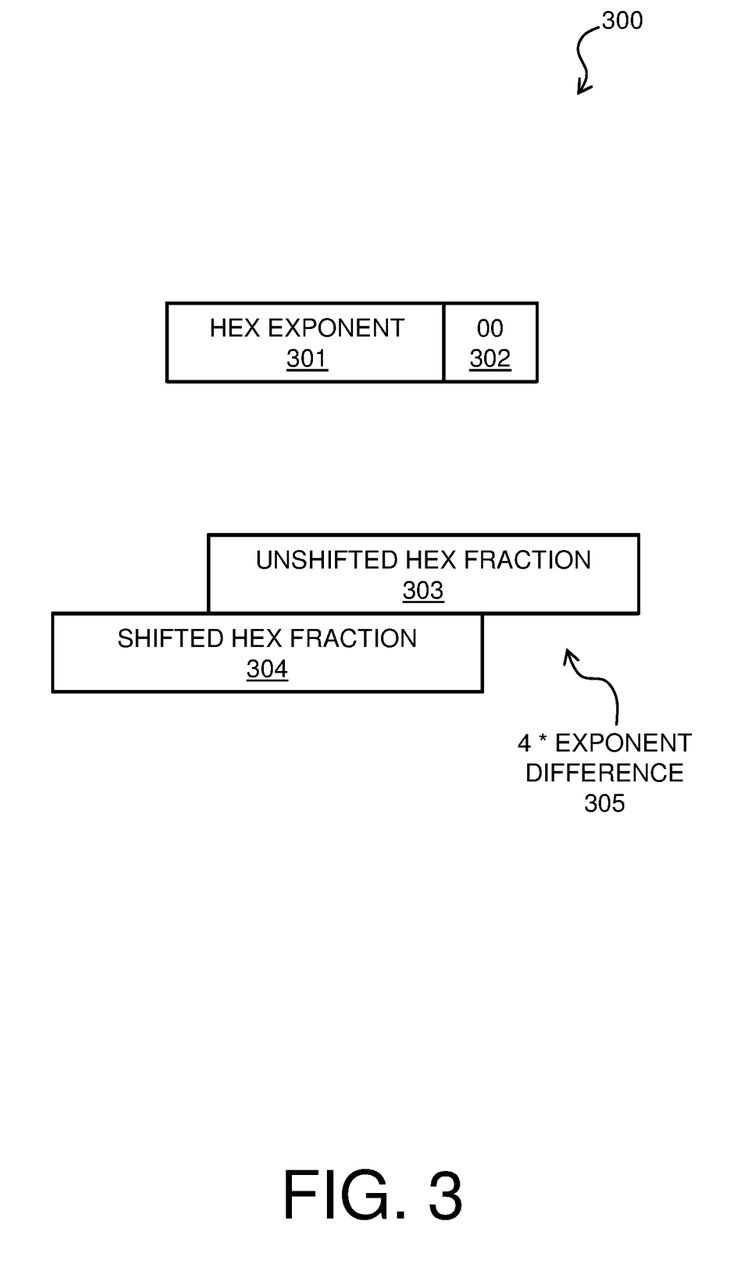
FIG. 3 is a block diagram of an example system for hexadecimal exponent alignment for a binary floating point unit.

FIG. 3 is a block diagram of an example system 300 for hexadecimal exponent alignment for a BFU, such as BFU 200 of FIG. 2. As shown in system 300, an operand comprising a hexadecimal floating point number that is received on input 201 of a BFU 200 includes hexadecimal exponent 301 and unshifted hexadecimal fraction 303. In the exponent unit 202, the hexadecimal exponent 301 is multiplied by a factor of 4 (e.g., 100 in binary) by hexadecimal exponent shift 302. Therefore, as shown in system 300, the hexadecimal exponent shift 302 causes two zeroes to be appended at the least significant bits of the hexadecimal exponent 301. The factor of 4 corresponding to hexadecimal exponent shift 302 causes the aligner shift amount 204 to be multiplied by a factor of 4. Therefore, the difference between the unshifted hexadecimal fraction 303 that is received by aligner 203 and shifted hexadecimal fraction 304 that is output by the aligner 203 is 4 times the exponent difference between the operands. The factor of 4 corresponds to the 4 binary bits that make up each hexadecimal digit in a hexadecimal fraction. FIG. 3 is shown for illustrative purposes only. For example, a hexadecimal fraction may be shifted in any appropriate direction in various embodiments.

Figure 4:
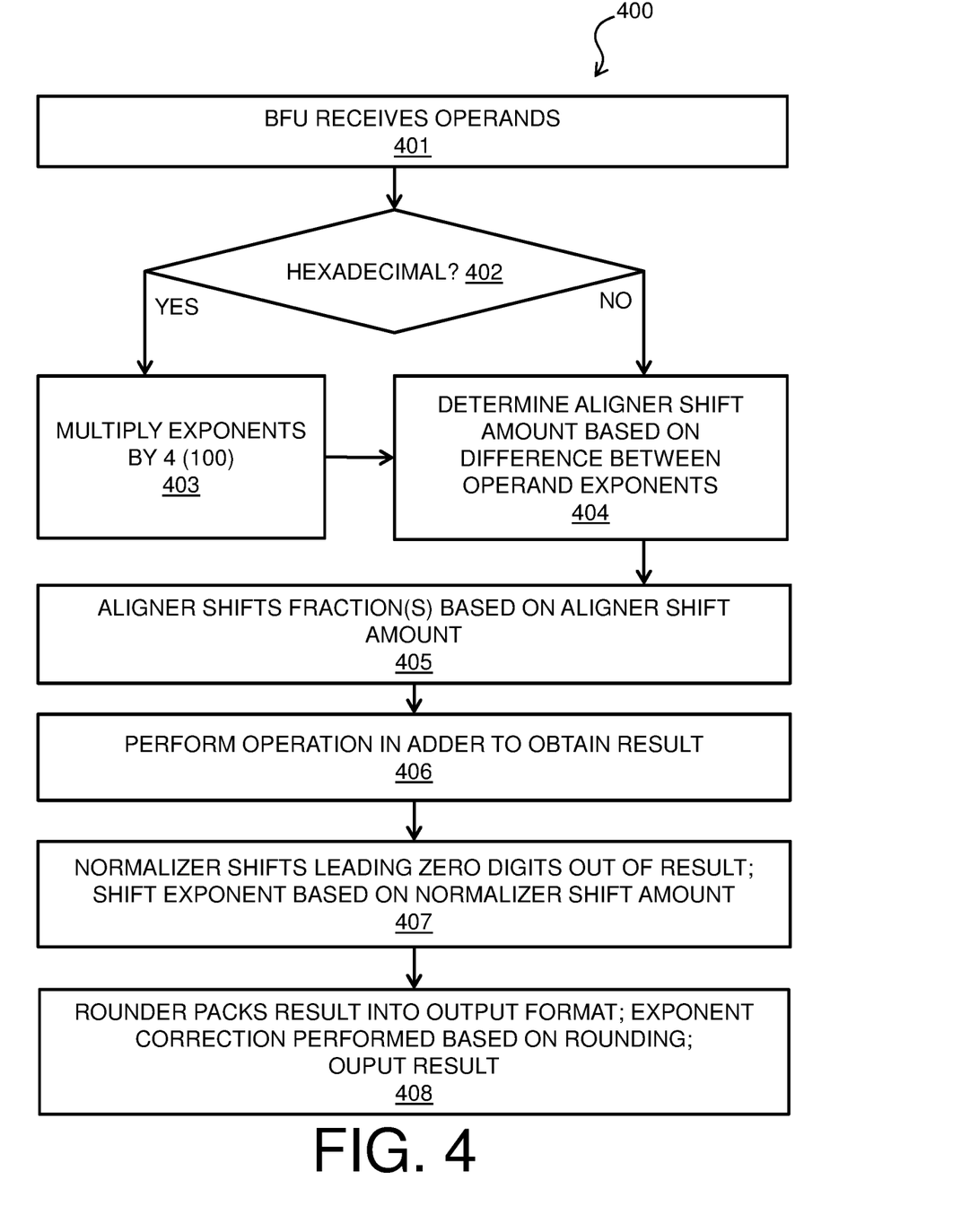
FIG. 4 is a process flow diagram of an example method for hexadecimal exponent alignment for a binary floating point unit.

FIG. 4 is a process flow diagram of an example method 400 for hexadecimal exponent alignment for a BFU. Method 400 may be implemented in conjunction with system 300 of FIG. 3 in BFU 200 of FIG. 2. In block 401, the BFU 200 receives operands, each operand comprising a respective fraction and exponent, on input 201, and an operation code that specifies a format of the operands and a type of operation. The BFU 200 may receive any appropriate number of operands in block 401 (e.g., two or more). The operands for a given operation are in the same format, i.e., either binary or hexadecimal numbers. The exponents of the operands are provided to the exponent unit 202, and the fractions of the operands are provided to aligner 203. In block 402, it is determined based on the operation code whether the operands are in the hexadecimal format. If it is determined based on the operation code in block 402 that the operands are in the hexadecimal format, flow proceeds to block 403, in which the operand exponents are multiplied by a factor of 4 (e.g., 100 in binary). As shown in FIG. 3, a hexadecimal exponent shift 302 comprising "00" may be appended at the least significant bits of each of the operand exponents in block 403 by the exponent unit 202. Flow then proceeds from block 403 to block 404. If it was determined in block 402 that the operands are not in hexadecimal format (e.g., the operands are another format such as binary format), flow proceeds directly from block 402 to block 404.

In block 404, the exponent unit 202 determines aligner shift amount 204 based on a difference between the operand exponents, and provides the aligner shift amount 204 to the aligner 203. The aligner shift amount 204 causes the exponents of the operands to match. In block 405, the aligner 203 shifts the fraction of at least one of the operands based on the aligner shift amount 204 (e.g., as shown by shifted hexadecimal fraction 304 of FIG. 3), and provides the operand fractions to the adder 205. The adder 205 performs an operation on the operand fractions in block 406 of method 400, and outputs a fraction corresponding to a result to the normalizer 206.

In block 407, the exponent unit 202 and normalizer 206 normalize the result. The normalizer 206 shifts any leading zero digits out of the result fraction based on the normalizer shift amount 209, and the exponent unit 202 adjusts the result exponent based on the normalizer shift amount 209. Flow then proceeds to block 408.

In block 408, the rounder 210 packs the normalized result fraction into an output format, which may be a binary or hexadecimal floating point format (including but not limited to single or double precision). The output format may specify a limited number of digits for the result. If the result fraction is rounded up by the rounder 210 to fit in the output format, and the rounding leads to an additional most significant bit or digit in the fraction which makes exponent adjustment necessary, a rounding notification 211 is sent to exponent unit 202, and the exponent unit 202 adjusts the result exponent based on the rounding notification 211. In some embodiments, if the result is a hexadecimal number, the two least significant bits of the exponent (i.e., the appended "00") may be set to "11" by the exponent unit 202 in block 408, and one may be added to the least significant bit of the exponent. In some embodiments, if the result is a hexadecimal number, the exponent unit 202 may adjust the exponent in block 408 to account for the factor of 4 that was included in the operand exponents in block 402 (e.g., divide by 4, or remove the two least significant bits that were appended to the least significant bits in the exponent in block 403). The result fraction from rounder 210 and the result exponent from exponent unit 202 are then output in either the hexadecimal or binary floating point format on BFU output 212, and method 400 ends.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

In an illustrative example of an embodiment of method 400 of FIG. 4, hexadecimal operands that may be received at input 201 by a BFU 200 in block 401 may include:

Operand1: $16^7*0.110111001011$ (or $16^7*0.DCB$)

Operand2: $16^5*0.0010.0011.0101$ (or $16^5*0.235$)

In this example, the exponent of Operand1 is 7 (or 111 in binary), and the exponent of Operand2 is 5 (or 101 in binary). In block 402, the binary representation of each of the hexadecimal exponents is multiplied by 4, or 100 in binary. Therefore, the exponent field of Operand1 becomes 11100 (i.e., 28), and the exponent of Operand2 becomes 10100 (i.e., 20). In block 403, the exponent unit 202 determines a difference between the exponents to calculate aligner shift amount 204. In this example, the aligner shift amount 204 is 8, or 1000 in binary. The aligner 203 may shift the fraction of the smaller of the operands (i.e., Operand2) two hexadecimal digits (i.e., 8 bits) to the right in block 405. Therefore, the operation that is performed in block 406 may be:

| Operand1 | 0.110111001011+ | $*16^{28}$ |
| Operand2 | 0.00000000001000110101= | $*16^{28}$ |
| Result | 0.11011100110100110101 | $*16^{28}$ |

In this example, no normalization is needed in block 407, because there are no leading zeroes in the result fraction. Rounding may be to precision length in block 408. The exponent may be corrected in block 408 to remove the factor of 4 that was included in the operand exponents in block 402. The result that is output by the BFU at output 212 in block 408 may be $16^7*0.110111001101$, or $16^7*DCD$.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system, comprising a binary floating point unit (BFU) of a processor configured to:
receive a first operand comprising a first fraction and a first exponent, and a second operand comprising a second fraction and a second exponent, wherein the BFU accepts operands in at least a first floating point format and a second floating point format;
determine that the first operand and the second operand are in the first floating point format; and
based on determining that the first operand and the second operand are in a the first floating point format, multiply, by an exponent unit of the BFU, each of the first exponent and the second exponent by a factor corresponding to a number of bits in a digit in the first floating point format, wherein the first floating point format comprises a hexadecimal floating point format, and the second floating point format comprises a binary floating point format;
wherein the factor is 4; and
wherein multiplying each of the first exponent and the second exponent by the factor comprises appending two zeroes as least significant bits to each of the first exponent and the second exponent.

2. The system of claim 1, the BFU further configured to:
determine an aligner shift amount based on a difference between the first exponent and the second exponent by the exponent unit, wherein the exponent unit includes logic for determining the aligner shift amount that is shared by the first floating point format and the second floating point format; and
provide the aligner shift amount from the exponent unit to an aligner of the BFU.

3. The system of claim 2, the BFU further configured to:
shift the first fraction based on the aligner shift amount, wherein, based on the first operand and the second operand being in the first floating point format, the first fraction is shifted by an amount corresponding to the factor.

4. The system of claim 3, the BFU further configured to:
determine a result based on the shifted first fraction and the second fraction, the result comprising a result fraction and a result exponent;
normalize the result fraction by a normalizer of the BFU, wherein the normalizing comprises determining a normalizer shift amount based on a number of zero digits located in most significant bits of the result fraction, and wherein the normalizer includes logic for determining the normalizer shift amount that is shared by the first floating point format and the second floating point format; and
adjust the result exponent by the exponent unit based on the normalizer shift amount, wherein the exponent unit includes logic for adjusting the result exponent based on the normalizer shift amount that is shared by the first floating point format and the second floating point format.

5. The system of claim 4, the BFU further configured to:
round the normalized result fraction by a rounder of the BFU; and based on the result being in the first floating point format, set each of two least significant bits of the result exponent equal to 1 by the exponent unit.

6. A computer-implemented method, comprising:
receiving, by a binary floating point unit (BFU) of a processor, a first operand comprising a first fraction and a first exponent, and a second operand comprising a second fraction and a second exponent, wherein the BFU accepts operands in at least a first floating point format and a second floating point format;
determining that the first operand and the second operand are in the first floating point format; and
based on determining that the first operand and the second operand are in a the first floating point format, multiplying, by an exponent unit of the BFU, each of the first exponent and the second exponent by a factor corresponding to a number of bits in a digit in the first floating point format, wherein the first floating point format comprises a hexadecimal floating point format, and the second floating point format comprises a binary floating point format;
wherein the factor is 4; and
wherein multiplying each of the first exponent and the second exponent by the factor comprises appending two zeroes as least significant bits to each of the first exponent and the second exponent.

7. The computer-implemented method of claim 6, the method comprising:
determining an aligner shift amount based on a difference between the first exponent and the second exponent by the exponent unit, wherein the exponent unit includes logic for determining the aligner shift amount that is shared by the first floating point format and the second floating point format; and
providing the aligner shift amount from the exponent unit to an aligner of the BFU.

8. The computer-implemented method of claim 7, the method comprising:
shifting the first fraction based on the aligner shift amount by the aligner, wherein, based on the first operand and the second operand being in the first floating point format, the first fraction is shifted by an amount corresponding to the factor.

9. The computer-implemented method of claim 8, the method comprising:
determining a result based on the shifted first fraction and the second fraction, the result comprising a result fraction and a result exponent;
normalizing the result fraction by a normalizer of the BFU, wherein the normalizing comprises determining a normalizer shift amount based on a number of zero digits located in most significant bits of the result fraction, and wherein the normalizer includes logic for determining the normalizer shift amount that is shared by the first floating point format and the second floating point format; and
adjusting the result exponent by the exponent unit based on the normalizer shift amount, wherein the exponent unit includes logic for adjusting the result exponent based on the normalizer shift amount that is shared by the first floating point format and the second floating point format.

10. The computer-implemented method of claim 9, the method comprising:
round the normalized result fraction by a rounder of the BFU; and
based on the result being in the first floating point format, set each of two least significant bits of the result exponent equal to 1 by the exponent unit.

11. An apparatus, comprising logic configured to:
receive a first operand comprising a first fraction and a first exponent, and a second operand comprising a second fraction and a second exponent, wherein the logic accepts operands in at least a first floating point format and a second floating point format;
determine that the first operand and the second operand are in the first floating point format; and
based on determining that the first operand and the second operand are in the first floating point format, multiply each of the first exponent and the second exponent by a factor corresponding to a number of bits in a digit in the first floating point format, wherein the first floating point format comprises a hexadecimal floating point format, and the second floating point format comprises a binary floating point format;
wherein the factor is 4; and
wherein multiplying each of the first exponent and the second exponent by the factor comprises appending two zeroes as least significant bits to each of the first exponent and the second exponent.

12. The apparatus of claim 11, the logic further configured to:
determine an aligner shift amount based on a difference between the first exponent and the second exponent by an exponent unit, wherein logic for determining the aligner shift amount is shared by the first floating point format and the second floating point format; and
provide the aligner shift amount from the exponent unit to an aligner.

13. The apparatus of claim 12, the logic further configured to:
shift the first fraction based on the aligner shift amount, wherein, based on the first operand and the second operand being in the first floating point format, the first fraction is shifted by an amount corresponding to the factor.

14. The apparatus of claim 13, the logic further configured to:
determine a result based on the shifted first fraction and the second fraction, the result comprising a result fraction and a result exponent;
normalize the result fraction, wherein the normalizing comprises determining a normalizer shift amount based on a number of zero digits located in most significant bits of the result fraction, and wherein logic for determining the normalizer shift amount is shared by the first floating point format and the second floating point format; and
adjust the result exponent based on the normalizer shift amount, wherein logic for adjusting of the result exponent based on the normalizer shift amount is shared by the first floating point format and the second floating point format.

* * * * *